(12) United States Patent
Wang et al.

(10) Patent No.: US 8,389,158 B2
(45) Date of Patent: Mar. 5, 2013

(54) LITHIUM-ION BATTERY USING PHOSPHORATED COMPOSITE

(75) Inventors: Li Wang, Beijing (CN); Xiang-Ming He, Beijing (CN); Jian-Guo Ren, Beijing (CN); Wei-Hua Pu, Beijing (CN); Jian-Jun Li, Beijing (CN); Jian Gao, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 401 days.

(21) Appl. No.: 12/720,600

(22) Filed: Mar. 9, 2010

(65) Prior Publication Data

US 2010/0239905 A1    Sep. 23, 2010

(30) Foreign Application Priority Data

Mar. 18, 2009    (CN) .......................... 2009 1 0080303

(51) Int. Cl.
*H01M 4/02* (2006.01)
*H01M 4/13* (2010.01)
*H01M 4/58* (2010.01)
*H01B 1/04* (2006.01)
*C01B 25/00* (2006.01)

(52) U.S. Cl. .................. 429/209; 429/218.1; 429/231.8; 252/502; 423/322; 423/323

(58) Field of Classification Search .................. 252/502, 252/500; 429/128, 137, 209, 212–215, 218.1, 429/231.7, 231.8, 231.9, 231.95; 106/18.14, 106/287.29; 423/299, 322, 323; 427/255.38
See application file for complete search history.

(56) References Cited

U.S. PATENT DOCUMENTS

| 3,883,475 | A | * | 5/1975 | Racky et al. .................. 524/414 |
| 4,337,125 | A | * | 6/1982 | Kuck et al. .................... 205/420 |
| 4,392,962 | A | * | 7/1983 | Lehr et al. ..................... 210/688 |
| 2008/0038626 | A1 | * | 2/2008 | Park et al. ........................ 429/50 |

FOREIGN PATENT DOCUMENTS

| JP | 3-137010 | | 6/1991 |
| JP | 9-102312 | | 4/1997 |
| JP | 10-241690 | | 9/1998 |
| JP | 11-25982 | | 1/1999 |
| JP | 11-67207 | | 3/1999 |
| JP | 2002110143 | A * | 4/2002 |
| TW | 200425569 | | 11/2004 |
| TW | 200737573 | | 10/2007 |

OTHER PUBLICATIONS

Cheol-Min et al. "Black Phosphorus and its Composite for Lithium Rechargeable Batteries", Adv. Mater. (2007), vol. 19, p. 2465-2468.

* cited by examiner

*Primary Examiner* — Carlos Barcena
(74) *Attorney, Agent, or Firm* — Altis Law Group, Inc.

(57) ABSTRACT

A lithium-ion battery includes an anode, a cathode, and an electrolyte. The anode includes a phosphorated composite including a conductive matrix and a red phosphorus. The conductive matrix includes a material being selected from the group consisting of conductive polymer and conductive carbonaceous material. A weight percentage of the conductive matrix in the phosphorated composite ranges from about 10% to about 85%. A weight percentage of the red phosphorus in the phosphorated composite ranges from about 15% to about 90%.

10 Claims, 3 Drawing Sheets

LITHIUM-ION BATTERY USING PHOSPHORATED COMPOSITE

RELATED APPLICATIONS

This application claims all benefits accruing under 35 U.S.C. §119 from China Patent Application No. 200910080303.8, filed on Mar. 18, 2009 in the China Intellectual Property Office. This application is related to applications entitled "PHOSPHORATED POLYMER, METHOD FOR MAKING THE SAME, AND LITHIUM-ION BATTERY USING THE SAME," filed on Mar. 9, 2010 with U.S. patent application Ser. No. 12/720,596.

BACKGROUND

1. Technical Field

The present disclosure relates to a phosphorated composite for electrochemical reversible lithium storage, method for making the same, and a lithium-ion battery using the same.

2. Description of Related Art

Lithium-ion batteries are used as portable power sources for a wide variety of electronic devices, such as cellular phones, notebook computers, and camcorders.

At present, graphite is used as an anode material for lithium-ion batteries, but higher capacity alternatives are being actively pursued. Among the many possible alternatives, a lot of work has been devoted to Sn-based oxide, Si-based composite, transition metal oxide, metal nitride, and metal phosphide systems, due to their ability to react reversibly with large amounts of Lithium (Li) per formula unit. However, the metal phosphides such as, $MnP_4$, $CoP_3$, $CuP_2$, $Cu_3P$, $FeP_2$, $Li_2CuP$, $TiP_2$ are inorganic composites that have bad cycle performance.

In one article, entitled "Black Phosphorus and its Composite for Lithium Rechargeable Batteries" by Hun-Joon Sohn et al., Advanced materials, Vol 19, P 2465-2468 (2007), a black P-carbon composite and method for making the same is disclosed. The black P-carbon composite includes orthorhombic black phosphorus and carbon modification, and it can be applied as an anode material for lithium-ion batteries. However, the orthorhombic black phosphorus is expensive and the black P-carbon composite is hard to make. Thus, the cost of the lithium-ion batteries is increased.

What is needed, therefore, is to provide a phosphorated anode material for lithium-ion batteries which is inexpensive and easy to make.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout several views.

DETAILED DESCRIPTION

Figure 1:
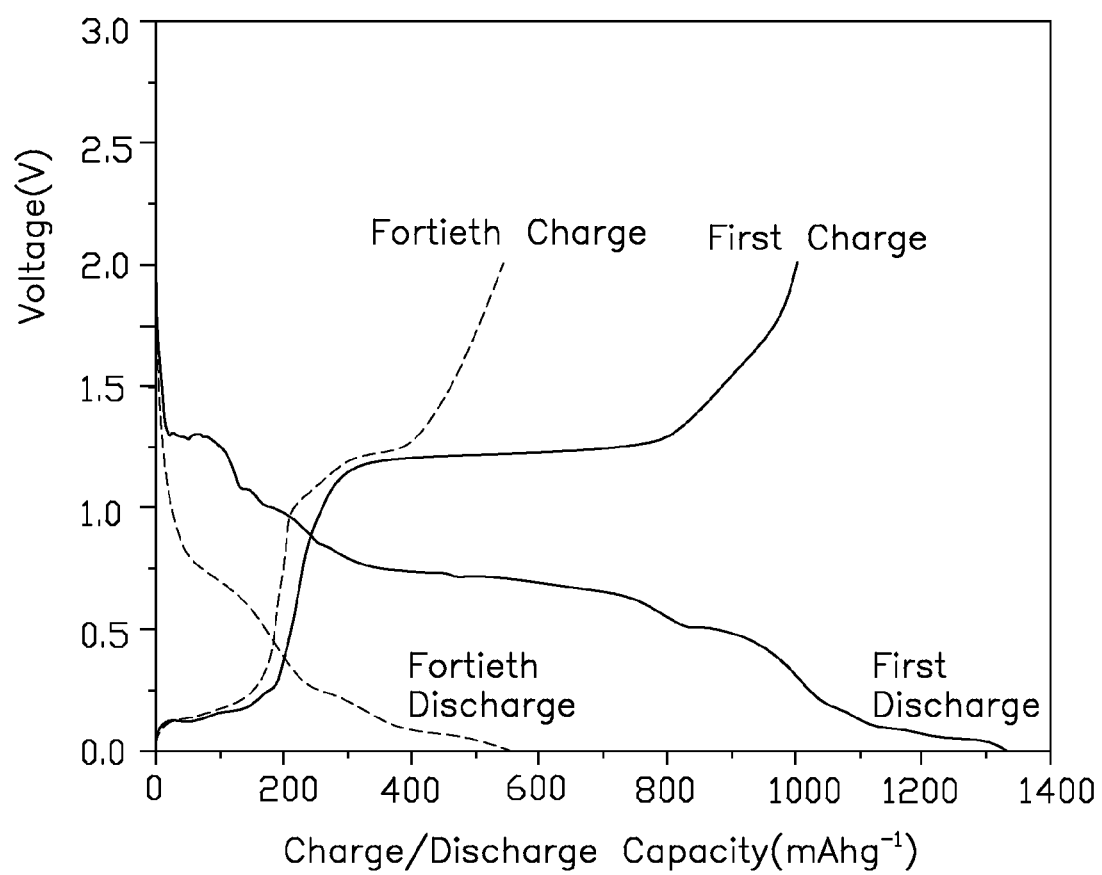
FIG. 1 is a voltage profile of charge/discharge performance of a lithium-ion battery according to an embodiment.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

A phosphorated composite for electrochemical reversible lithium storage of one embodiment includes a conductive matrix and a red phosphorus. The conductive matrix can be a conductive polymer and/or a conductive carbonaceous material. The weight percentage of the conductive matrix in the phosphorated composite ranges from about 10% to about 85%, and the weight percentage of the red phosphorus in the phosphorated composite ranges from about 15% to about 90%.

The conductive polymer can be conjugated conductive polymer. The conjugated conductive polymer can be a production of a reaction of a polymer under catalysis of the red phosphorus. The reaction can be dehydration, de-amine, dehydrogenation or dehydrohalogenation. The polymer can be polypropylene, polyacrylonitrile (PAN), polystyrene, polyethylene oxide, polyvinyl alcohol (PVA), polyvinylidenechloride, polyvinylidene fluoride (PVDF), polyvinyl fluoride (PVF), polyvinyl chloride (PVC), poly1,2-chloride ethylene, poly1,2-fluoride ethylene, polymethyl methacrylate, phenolic resin or any suitable polymer which can change into conjugated conductive polymer under catalysis of the red phosphorus.

The conductive carbonaceous material can be active carbon, acetylene black, conductive graphite, or conductive amorphous carbon. The conductive amorphous carbon can be made by dehydrogenation of organic matter such as sugar or cellulose. The dehydrogenation causes the amorphous carbon to be conductive.

A method for making the phosphorated composite can include following steps:

step(a), mixing a source material with the red phosphorus to obtain a mixture, wherein the weight ratio of the source material to the red phosphorus ranges from about 1:10 to about 5:1;

step(b), drying the mixture in an inert atmosphere or vacuum, wherein the drying temperature ranges from about 50° C. to about 120° C.;

step (c), heating the mixture in a reacting room filled with an inert atmosphere so that the red phosphorus sublimes, wherein the heating temperature ranges from about 250° C. to about 600° C.; and step (d), cooling the reacting room down.

In step (a), the mixture can be milled by a ball milling process so that the source material and the red phosphorus are mixed uniformly. A purity of the red phosphorus is higher than that of industrial grade.

The source material can be the polymer and/or the conductive carbonaceous material. The polymer and the conductive carbonaceous material can be provided in the form of powder, particles, or fibers. The polymer can be any suitable polymer which can change into conductive polymer under catalysis of the red phosphorus at the heating temperature in step (c) and form an in situ composite with the red phosphorus. The polymer can be polypropylene, polyacrylonitrile (PAN), polystyrene, polyethylene oxide, polyvinyl alcohol (PVA), polyvinylidenechloride, polyvinylidene fluoride (PDVF), polyvinyl fluoride (PVF), polyvinyl chloride (PVC), poly1,2-chloride ethylene, poly1,2-fluoride ethylene, polymethyl methacrylate, or phenolic resin. Also the polymer can be any suitable organic matter which can change into conductive amorphous carbon by dehydrogenation at the heating temperature in step (c) and form an in situ composite with the red phosphorus. The organic matter can be cellulose or sugar. The sugar can be glucose or amylase. The conductive carbonaceous material can be active carbon, acetylene black, conductive graphite, or conductive amorphous carbon.

In step (b), the mixture can be dried for a period of time from about 1 hour to 10 hours so that the water and impurities in the mixture are vaporized. The inert atmosphere can be dry high purity argon gas, dry high purity nitrogen gas, or dry high purity helium gas.

In step (c), the mixture can be heated in a sealed reacting room for a period of time from about 1 hour to about 48 hours. The reacting room can be reacting kettle or tube furnace. When the source material is polymer, the polymer can change into conductive polymer or conductive amorphous carbon and absorbs the sublimed red phosphorus to form an in situ composite. When the source material is conductive carbonaceous material, the conductive carbonaceous material can absorb the sublimed red phosphorus to form an in situ composite. The in situ composite is the phosphorated composite for electrochemical reversible lithium storage.

When the phosphorated composite is applied in a lithium-ion battery for electrochemical reversible lithium storage, the lithium-ion battery can include an anode, a cathode, a separator membrane, and an electrolyte. The anode includes the phosphorated composite described above. The cathode can be made of active material such as lithium cobaltate ($LiCoO_2$), lithium nickel cobaltate, lithium nickel oxides ($LiNiO_2$), lithium manganese oxide ($LiMnO_2$), or lithium iron phosphate ($LiFePO_4$). The electrolyte generally includes at least one solvent and lithium metal salt. The lithium metal salt is lithium hexafluorophosphate ($LiPF_6$). The solvent can be ethylene carbonate, propylene carbonate, dimethly carbonate, diethyl carbonate, dipropyl carbonate, ethyl methyl carbonate etc. Further, an additive can be added into the electrolyte.

Example 1

In example 1, the phosphorated composite of one embodiment is made by the following steps of:

step(1a), mixing the polyacrylonitrile (PAN, a product of Aldrich company) in form of particles with the red phosphorus having a purity of about 98% or greater than 98% to obtain a mixture and milling the mixture so that the polyacrylonitrile and the red phosphorus are mixed uniformly, wherein the weight ratio of polyacrylonitrile to the red phosphorus is 1:4;

step (1b), drying the mixture in dry high purity nitrogen gas for 6 hours, wherein the drying temperature is 70° C.;

step (1c), heating the mixture in a sealed tube furnace filled with dry high purity nitrogen gas so that the red phosphorus sublimes, wherein the heating temperature is 500° C. and heating time is 12 hours; and step (1d), cooling down the tube furnace to room temperature.

In step (1c), the polyacrylonitrile changes into the conjugated conductive polymer by dehydrogenation under catalysis of the red phosphorus and absorbs the sublimed red phosphorus to form the phosphorated composite. The phosphorated composite includes the conjugated conductive polymer and the red phosphorus. A measurement of one embodiment by an element analyzer find that the weight percentage of the conjugated conductive polymer in the phosphorated composite is 45%, and the weight percentage of the red phosphorus in the phosphorated composite is 55%.

Furthermore, an embodiment of a lithium-ion battery, comprising of an embodiment of the phosphorated composite of example 1 is provided. The anode includes an electrode and a nickel foam current collector. The electrode includes an embodiment of the phosphorated composite of example 1, a bonder, a conductive agent, and a dispersant with a weight ratio of 80:10:5:5. The bonder is a poly(tetrafluoroethylene), the conductive agent is acetylene black and conductive graphite with a weight ratio of 1:1, and the dispersant is an ethanol. The cathode is a lithium metal sheet. The separator membrane is a CELGARD 2400. The electrolyte is 1 mol/L mixture solution of $LiPF_6$ and a mixture solvent of ethylene carbonate, diethyl carbonate and dimethly carbonate with a volume ratio of 1:1:1.

A charge/discharge performance of one embodiment of the lithium-ion battery is tested. The open circuit voltage of the lithium-ion battery is 2.7V, and the charge/discharge capacity of the first cycle is 650 mAh/g. The charge/discharge capacity is greater than 400 mAh/g after 40 cycles.

Example 2

In example 2, the phosphorated composite of one embodiment is made by the following steps of:

step(2a), mixing the polyvinylidene chloride (PVDC) in form of powder with the red phosphorus having a purity of about 98% or greater than 98% to obtain a mixture and milling the mixture so that the polyvinylidene chloride and the red phosphorus are mixed uniformly, wherein the weight ratio of polyvinylidene chloride to the red phosphorus is 1:2;

step (2b), drying the mixture in dry high purity nitrogen gas for 6 hours, wherein the drying temperature is 80° C.;

step (2c), heating the mixture in a sealed tube furnace filled with dry high purity nitrogen gas so that the red phosphorus sublimes, wherein the heating temperature is 450° C. and heating time is 3 hours; and step (2d), cooling down the tube furnace to room temperature.

In step (2c), the polyvinylidene chloride changes into the conjugated conductive polymer by dehydrogenation under the catalysis of the red phosphorus and absorbs the sublimed red phosphorus to form the phosphorated composite. The phosphorated composite includes the conjugated conductive polymer and the red phosphorus. A measurement of one embodiment by an element analyzer find that the weight percentage of the conjugated conductive polymer in the phosphorated composite is 60%, and the weight percentage of the red phosphorus in the phosphorated composite is 40%.

Furthermore, an embodiment of a lithium-ion battery, comprising of an embodiment of the phosphorated composite of example 2 is provided. The electrode includes an embodiment of the phosphorated composite of example 2, a bonder, a conductive agent, and a dispersant with a weight ratio of 80:10:5:5. The bonder is a poly(tetrafluoroethylene), the conductive agent is acetylene black and conductive graphite with a weight ratio of 1:1, and the dispersant is an ethanol. The cathode is a lithium metal sheet. The separator membrane is a CELGARD 2400. The electrolyte is 1 mol/L mixture solution of $LiPF_6$ and a mixture solvent of ethylene carbonate, diethyl carbonate and dimethly carbonate with a volume ratio of 1:1:1

A charge/discharge performance of one embodiment of the lithium-ion battery is tested. The open circuit voltage of the lithium-ion battery is 2.7V, and the charge/discharge capacity of the first cycle is 1150 mAh/g. The charge/discharge capacity is greater than 300 mAh/g after 40 cycles.

Example 3

In example 3, the phosphorated composite of one embodiment is made by the following steps of:

step(3a), mixing the active carbon in form of powder with the red phosphorus having a purity of about 98% or greater than 98% to obtain a mixture and ball milling the mixture so that the active carbon and the red phosphorus are mixed uniformly, wherein the weight ratio of active carbon to the red phosphorus is 1:1;

step (3b), drying the mixture in dry high purity nitrogen gas for 6 hours, wherein the drying temperature is 100° C.;

step (3c), heating the mixture in a sealed reacting kettle filled with dry high purity nitrogen gas so that the red phosphorus sublimes, wherein the heating temperature is 470° C. and heating time is 6 hours; and step (3d), cooling down the reacting kettle to room temperature.

In step (3c), the active carbon absorbs the sublimed red phosphorus to form the phosphorated composite. The phosphorated composite includes the active carbon and the red phosphorus. A measurement of one embodiment by an element analyzer find that the weight percentage of the active carbon in the phosphorated composite is 70%, and the weight percentage of the red phosphorus in the phosphorated composite is 30%.

Furthermore, an embodiment of a lithium-ion battery, comprising of an embodiment of the phosphorated composite of example 3 is provided. The anode includes an electrode and a copper foil current collector. The electrode includes an embodiment of the phosphorated composite of example 3, a bonder, and a conductive agent with a weight ratio of 4:5:5. The bonder is a poly(vinylidene fluoride-hexafluoropropylene) [P(VDF-HFP)], the conductive agent is acetylene black, and the dispersant is an N-methyl pyrrolidone (NMP). The cathode is a lithium metal sheet. The separator membrane in this embodiment is a CELGARD 2400 microporous polypropylene film. The electrolyte is 1 mol/L mixture solution of $LiPF_6$ and a mixture solvent of ethylene carbonate, diethyl carbonate and dimethly carbonate with a volume ratio of 1:1:1.

A charge/discharge performance of one embodiment of the lithium-ion battery is tested. The open circuit voltage of the lithium-ion battery is about 2.6V, and the charge/discharge capacity of the first cycle is 900 mAh/g. The charge/discharge capacity is greater than 500 mAh/g after 40 cycles. Referring to FIG. 1, a charge/discharge performance of one embodiment of the lithium-ion battery in example 3 is shown. The abscissa axis represents charge/discharge capacity and the ordinate axis represents voltage.

Example 4

In example 4, the phosphorated composite of one embodiment is made by the following steps of:

step(4a), mixing the conductive graphite in form of powder with the red phosphorus having a purity of about 98% or greater than 98% to obtain a mixture and ball milling the mixture so that the conductive graphite and the red phosphorus are mixed uniformly, wherein the weight ratio of active carbon to the red phosphorus is 1:1;

step (4b), drying the mixture in dry high purity argon gas for 6 hours, wherein the drying temperature is 100° C.;

step (4c), heating the mixture in a sealed reacting kettle filled with dry high purity argon gas so that the red phosphorus sublimes, wherein the heating temperature is 600° C. and heating time is 6 hours; and step (4d), cooling down the reacting kettle to room temperature.

In step (4c), the conductive graphite absorbs the sublimed red phosphorus to form the phosphorated composite. The phosphorated composite includes the conductive graphite and the red phosphorus. A measurement of one embodiment by an element analyzer find that the weight percentage of the conductive graphite in the phosphorated composite is 85%, and the weight percentage of the red phosphorus in the phosphorated composite is 15%.

Furthermore, an embodiment of a lithium-ion battery, comprising of an embodiment of the phosphorated composite of example 4 is provided. The anode includes an electrode and a copper foil current collector. The electrode includes an embodiment of the phosphorated composite of example 4, and a bonder, a conductive agent with a weight ratio of 4:5:5. The bonder is a poly(vinylidene fluoride-hexafluoropropylene) [P(VDF-HFP)], the conductive agent is acetylene black, and the dispersant is an N-methyl pyrrolidone (NMP). The cathode is a lithium metal sheet. The separator membrane in this embodiment is a CELGARD 2400 microporous polypropylene film. The electrolyte is 1 mol/L mixture solution of $LiPF_6$ and a mixture solvent of ethylene carbonate, diethyl carbonate and dimethly carbonate with a volume ratio of 1:1:1.

Figure 2:
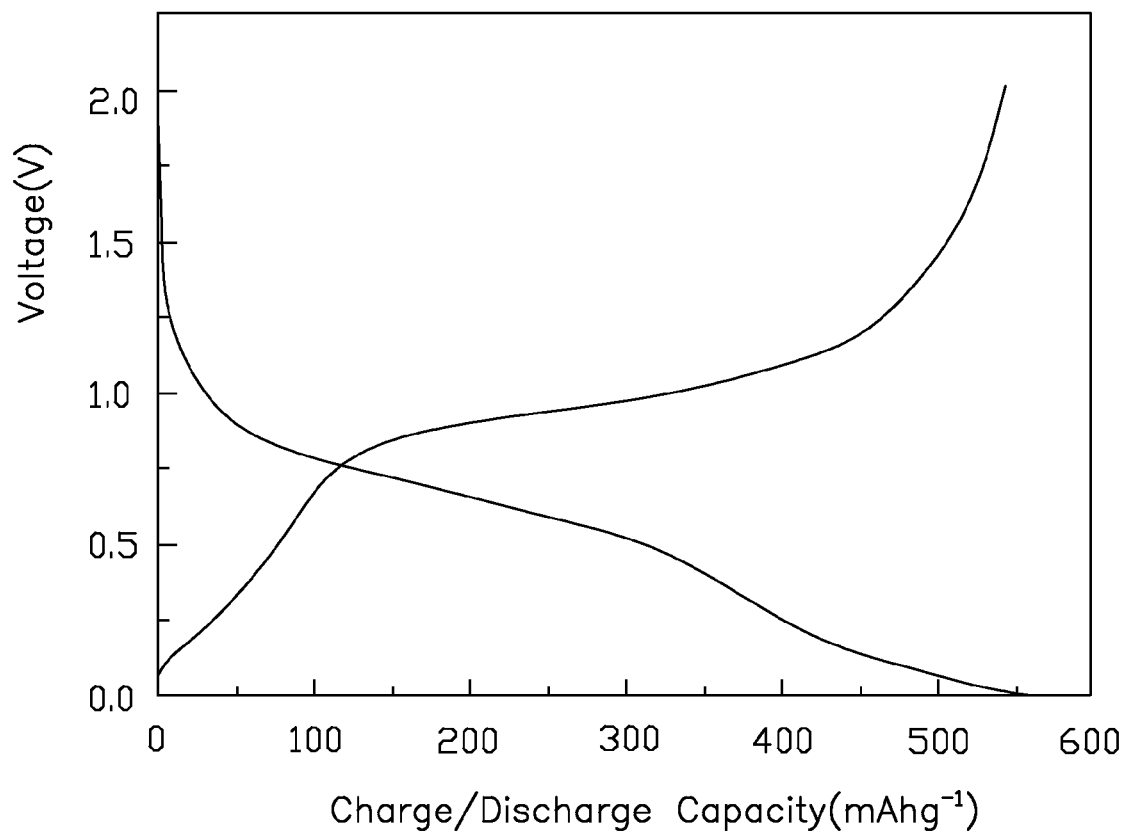
FIG. 2 is a voltage profile of charge/discharge performance of a lithium-ion battery according to an embodiment.
Figure 3:
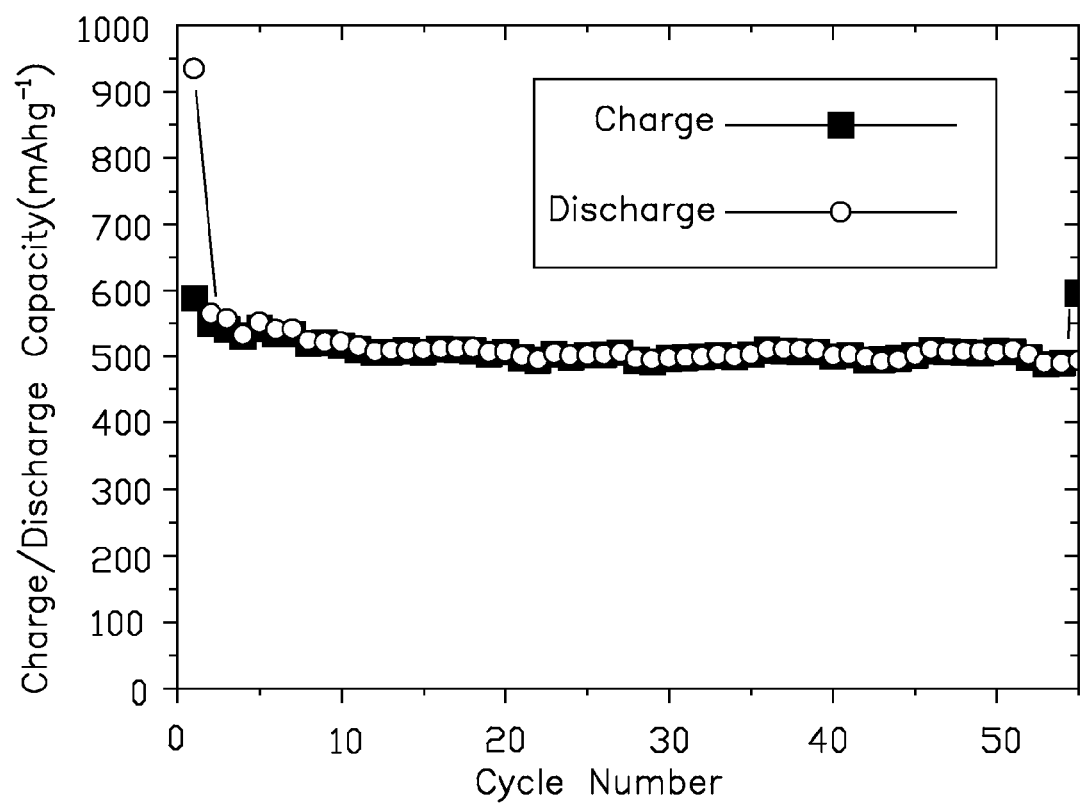
FIG. 3 is a charge/discharge capacity profile of cycle performances of a lithium-ion battery according to an embodiment.

A charge/discharge performance of one embodiment of the lithium-ion battery is tested. The open circuit voltage of the lithium-ion battery is 2.7V, and the charge/discharge capacity of the first cycle is 900 mAh/g. The charge/discharge capacity is greater than 500 mAh/g after 60 cycles. The coulombic efficiency during charge/discharge of the lithium-ion battery is close to 100%. Referring to FIG. 2, a charge/discharge performance of one embodiment of the lithium-ion battery in example 4 is shown. The abscissa axis represents charge/discharge capacity and the ordinate axis represents voltage. Referring to FIG. 3, cycle performances of one embodiment of the lithium-ion battery in example 4 is shown. The abscissa axis represents cycle number and the ordinate axis represents charge/discharge capacity.

It is to be understood that the above-described embodiments are intended to illustrate rather than limit the disclosure. Variations may be made to the embodiments without departing from the spirit of the disclosure as claimed. The above-described embodiments illustrate the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A lithium-ion battery comprising:
    an anode, a cathode, and an electrolyte;
    wherein the anode comprises a phosphorated composite comprising:
        a conductive matrix, the conductive matrix comprises a material being selected from the group consisting of conductive polymer and conductive carbonaceous material, and a weight percentage of the conductive matrix in the phosphorated composite ranging from about 10% to about 85%; and
        a red phosphorus, and a weight percentage of the red phosphorus in the phosphorated composite ranging from about 15% to about 90%.

2. The lithium-ion battery of claim 1, wherein the conductive polymer is conjugated conductive polymer.

3. The lithium-ion battery of claim 2, wherein the conjugated conductive polymer is a production of a reaction of a polymer under catalysis of the red phosphorus; and the reaction is dehydration, de-amine, dehydrogenation or dehydrohalogenation.

4. The lithium-ion battery of claim 3, wherein the polymer is selected from the group consisting of polypropylene, polyacrylonitrile, polystyrene, polyethylene oxide, polyvinyl alcohol, polyvinylidenechloride, polyvinylidene fluoride, polyvinyl fluoride, polyvinyl chloride, poly1,2-chloride ethylene, poly1,2-fluoride ethylene, polymethyl methacrylate, and phenolic resin.

5. The lithium-ion battery of claim 1, wherein the conductive carbonaceous material is selected from the group consisting of active carbon, acetylene black, conductive graphite, and conductive amorphous carbon.

6. The lithium-ion battery of claim 5, wherein the conductive amorphous carbon is made by dehydrogenation of sugar or cellulose.

7. The lithium-ion battery of claim 1, wherein the conductive matrix is a pyrolytic polyacrylonitrile with a weight percentage of about 45%, and the weight percentage of the red phosphorus is about 55%.

8. The lithium-ion battery of claim 1, wherein the conductive matrix is a pyrolytic polyvinylidene chloride with a weight percentage of about 60%, and the weight percentage of the red phosphorus is about 40%.

9. The lithium-ion battery of claim 1, wherein the conductive matrix is an active carbon with a weight percentage of about 70%, and the weight percentage of the red phosphorus is about 30%.

10. The lithium-ion battery of claim 1, wherein the conductive matrix is a conductive graphite with a weight percentage of about 85%, and the weight percentage of the red phosphorus is about 15%.

* * * * *